(12) United States Patent
Yamaguchi (10) Patent No.: US 6,569,522 B2
(45) Date of Patent: May 27, 2003

(54) LIGHT STORAGE AND REFLECTING DEVICE

(76) Inventor: Shoji Yamaguchi, c/o Yamaguchi Kogeisha Co., Ltd., 8-8, Jonanteramachi, Tennoji-ku, Osaka (JP)

( * ) Notice: Subject to any disclaimer, the term of this patent is extended or adjusted under 35 U.S.C. 154(b) by 0 days.

(21) Appl. No.: 09/902,738

(22) Filed: Jul. 12, 2001

(65) Prior Publication Data

US 2002/0015844 A1 Feb. 7, 2002

(30) Foreign Application Priority Data

Aug. 4, 2000 (JP) ......................................... 2000-237330

(51) Int. Cl.[7] .............................. B32B 7/12; G02B 5/128
(52) U.S. Cl. ........................ 428/354; 428/343; 40/559; 40/583; 362/812
(58) Field of Search ................................ 428/343, 354; 40/559, 583; 362/812

(56) References Cited

U.S. PATENT DOCUMENTS

2002/0015844 A1 * 2/2002 Yamaguchi .................. 428/354

FOREIGN PATENT DOCUMENTS

JP          7-84109          3/1995

* cited by examiner

Primary Examiner—Daniel Zirker
(74) Attorney, Agent, or Firm—Birch, Stewart, Kolasch & Birch, LLP (57) ABSTRACT

A light storage and reflecting device comprising a reflecting layer, base layer, light storage layer, and coating layer is arranged such that a thermocompression-bonding colored sheet of the base layer is bonded to the surface of the reflecting layer by a thermocompression bonding process, the light storage layer is formed by ink containing light storage pigment on the colored sheet, and all layers collectively are covered with the coating layer.

4 Claims, 11 Drawing Sheets

LIGHT STORAGE AND REFLECTING DEVICE

BACKGROUND OF THE INVENTION

The present invention relates to a reflecting device having light storage properties.

A sheet-like light storage and reflecting device having both reflecting properties and light storage properties based on a combination of a reflecting device and a light storage device, as disclosed by Japanese Patent Application Laid Open No. 7-84109. It is utilized for seals or stickers intended to warn other persons of its presence at night, or badges, or buttons, etc.

Said light storage and reflecting device comprises a reflecting layer, a base layer, a light storage layer, and a coating layer. When used in badges or buttons, said entire layers are mounted on the base devices of such articles.

With conventional light storage and reflecting devices, the base layer is formed on part of the reflecting layer by means of silk screen printing. Specifically, said printing process employed a one-pack-liquid vinyl chloride ink or polyester ink, or two-pack epoxy ink. There lie tasks in that former has a poor adherence relative to the reflecting layer, while referring to the latter, much time is needed to dry it, a completed base layer is not flexible, and additionally, cracks are liable to result from mutual reaction between the base layer and light storage layer formed on the base layer. In particular, about 3% of products have been found to have cracks during the production.

BRIEF SUMMARY OF THE INVENTION

For the purpose of solutions to said tasks, a first aspect of the present invention provides a light storage and reflecting device consisting of at least three layers, in which a base layer 3 formed on part of a reflecting layer 2, and a light storage layer 4 formed on said base layer 3, are characterized in that said base layer 3 is constituted by a thermocompression-bonding colored sheet.

A second aspect of the present invention is characterized in that the reflecting layer 2 and light storage layer 4 are covered with a coating layer 5, and said base layer 3 includes a synthetic resin layer 3a that may attach to part of said reflecting layer 2, and a colored layer 3b formed on the synthetic resin layer A third aspect of the present invention is characterized in that said reflecting layer 2 is provided with an adhesive layer 9 on the rear thereof.

A fourth aspect of the present invention is characterized in that the reflecting layer 2 is disposed on a base material 10, the base layer 3 is attached to part of said reflecting layer 2, the light storage layer 4 is attached to said base layer 3, and the coating layer 5 overlies all of said layers including said base material 10.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein:

FIG. 7 is a view showing the use of the light storage and reflecting device of the present invention as a tape, (A) being a perspective view of said device with a coating layer, (B) a perspective view of said device absent a coating layer, and (C) a view exemplifying the use of said tape, FIG. 8 is a view showing the use of the light storage and reflecting device of the present invention for tiepin, (A) a perspective view of the same, and (B) a cross sectional view of the same, FIG. 9 is a view showing the use of the light storage and reflecting device of the present invention for cuff links, (A) a perspective view of the same, and (B) a cross sectional view of the same, FIG. 10 is a view showing the use of the light storage and reflecting device of the present invention for a hairclasp, (A) a perspective view of the same, and (B) a cross sectional view of the same, and FIG. 11 is a view showing the use of the light storage and reflecting device of the present invention for a golf marker, (A) a perspective view of the same, and (B) a cross sectional view of the same. (C) is a perspective view showing the use of said device for another type of a golf marker.

DETAILED DESCRIPTION OF THE PREFERRED EMBODIMENTS

The preferred embodiments of the present invention will be described with reference to the accompanied drawings.

Figure 1:
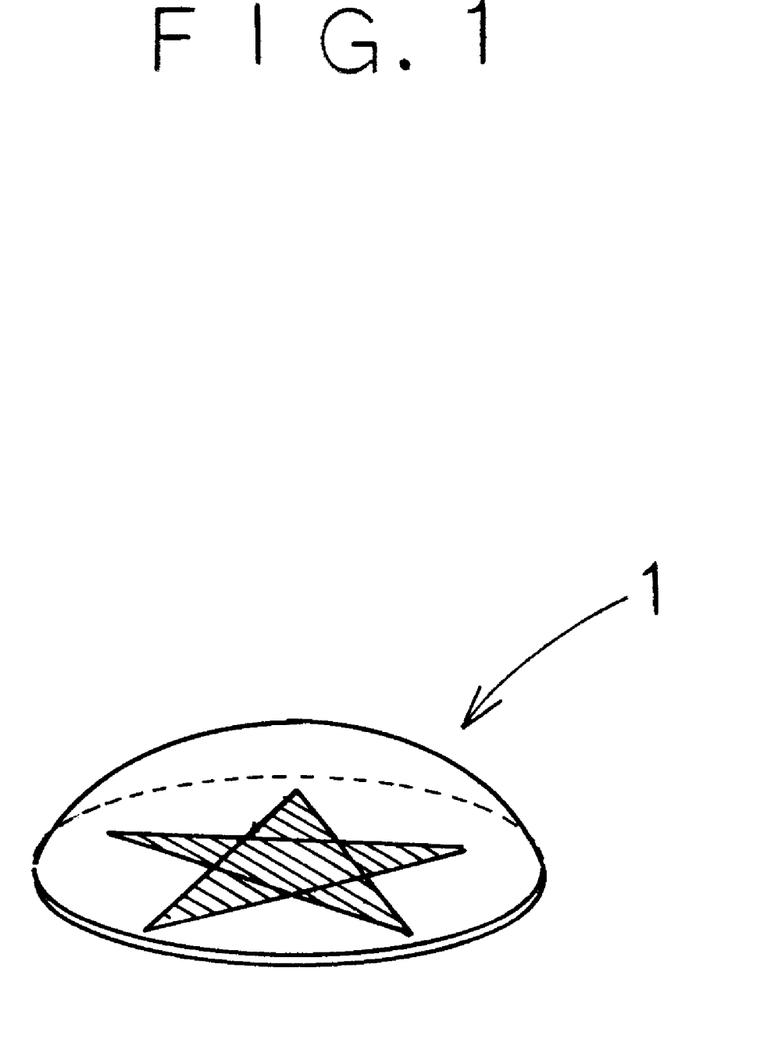
FIG. 1 is a perspective view of a light storage and reflecting device in accordance with an embodiment of the present invention.
Figure 2:
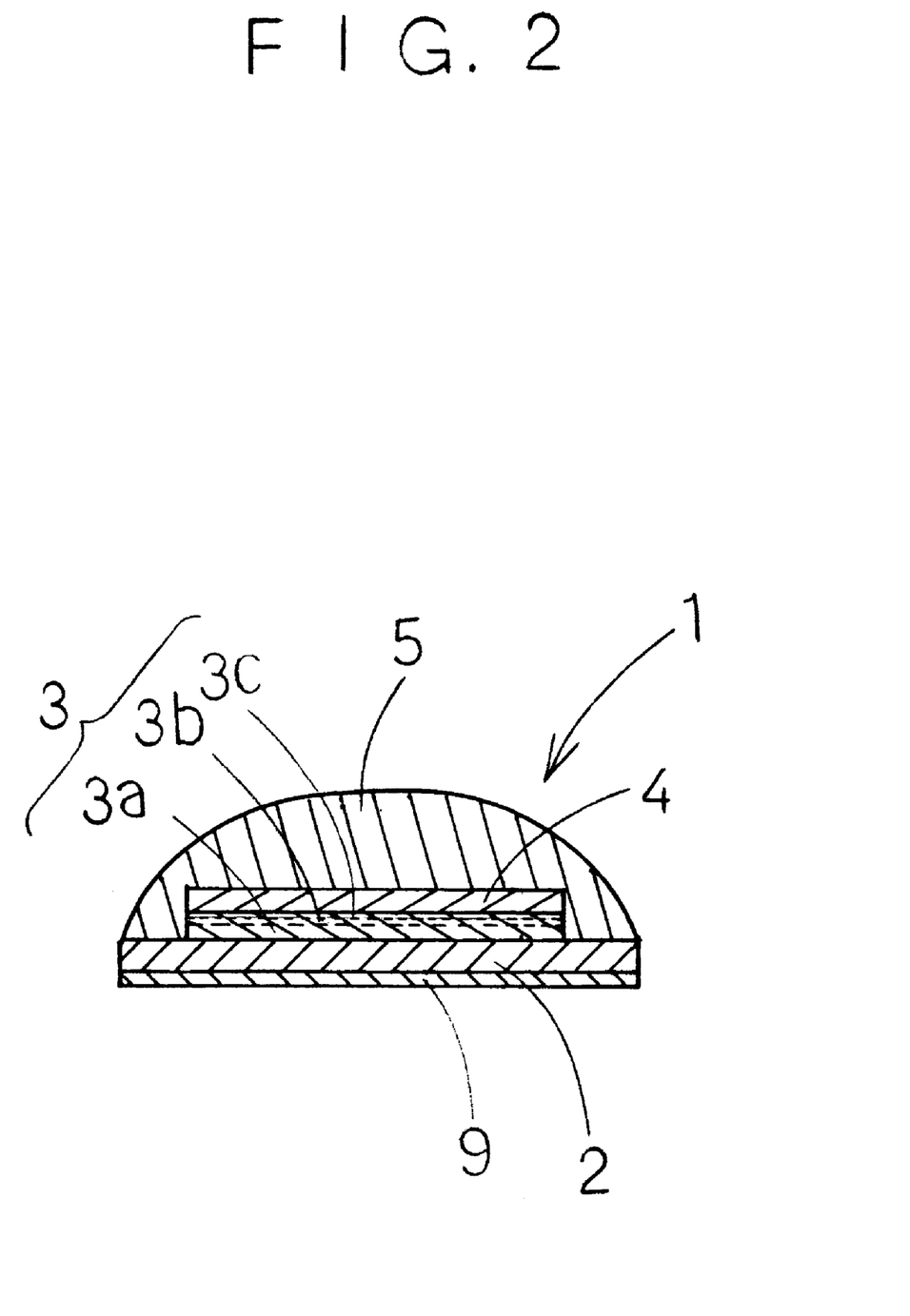
FIG. 2 is a cross sectional view depicting the structure of the light storage and reflecting device in accordance with the embodiment of the present invention.

FIG. 1 is a perspective view of a light storage and reflecting device in accordance with a first embodiment of the present invention, and FIG. 2 is a cross sectional view of the same.

As shown in FIG. 2, a light storage and reflecting device 1 in accordance with a first embodiment of the present invention comprises a reflecting layer 2, a base layer 3, a light storage layer 4, and a coating layer 5.

Figure 3:
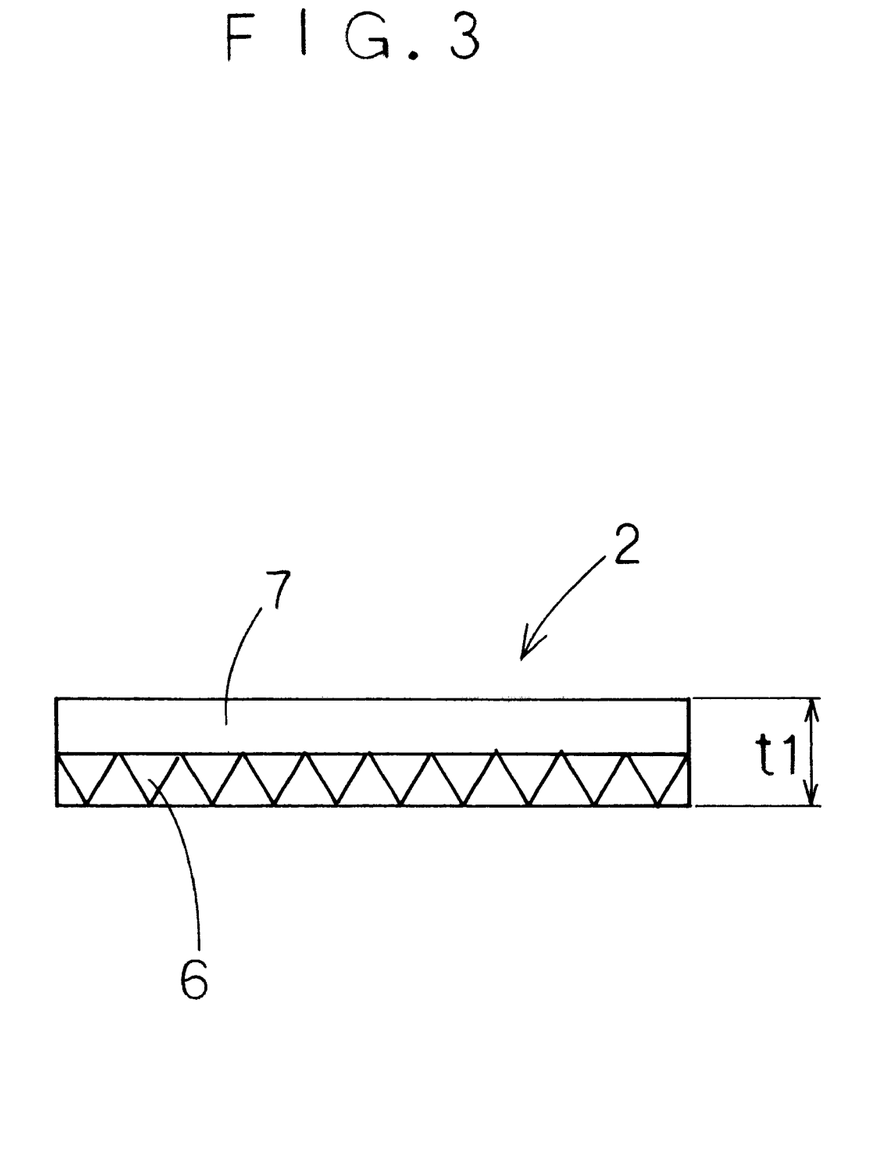
FIG. 3 is a cross sectional view depicting the structure of a reflecting layer.

As shown in FIG. 3, the reflecting layer 2 is composed of minute prisms 6 or glass beads arranged on the plane and coated with a transparent resin layer such as polyester resin, etc. The thickness t1 of the reflecting layer 2 is 0.2 mm, but this value may be changed as desired.

The base layer 3 is intended to separate the reflecting layer 2 and the light storage layer 4. This may ensure not only avoidance of interference by both the reflecting layer 2 and the light storage layer 4 but also increase of the light storage layer 4 in spreadability and grab.

Figure 4:
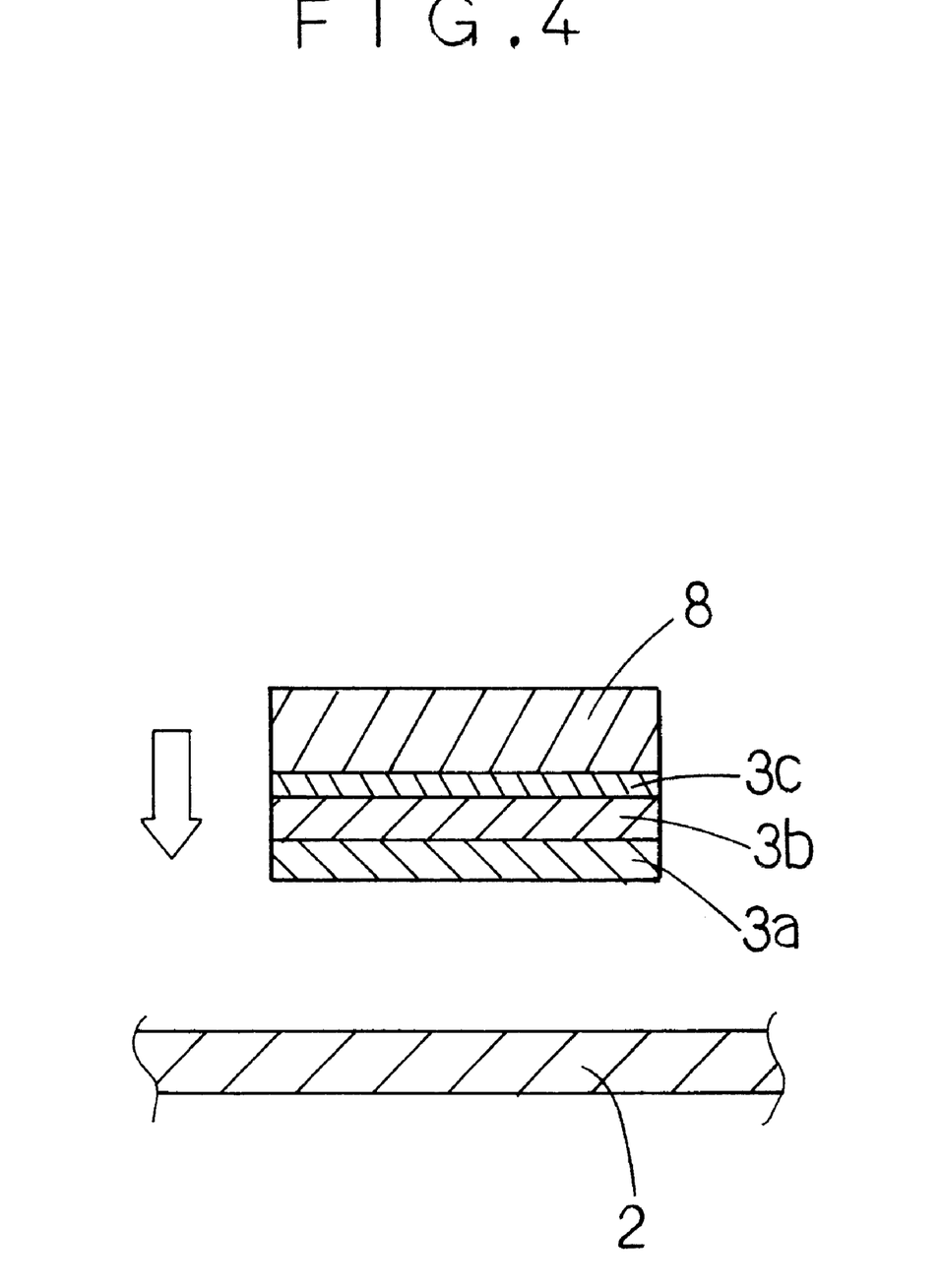
FIG. 4 is a cross sectional view depicting a mounting process for light storage layer.

Said base layer 3, which is constituted by a thermocompression-bonding colored sheet, is attached to part of the reflecting layer 2. The base layer 3 is composed of three different layers, such as a synthetic resin layer 3a, a colored layer 3b, and silicone layer 3c. The synthetic resin layer 3a consists of a thermocompression-bonding synthetic resin, and the colored layer 3b consists of an opaque layer painted bright color, such as white. In this embodiment, the base layer 3 is formed by titan foil, or the colored layer 3b is made by a pigment layer whose chief ingredient is white titan pigment. As illustrated by FIG. 4, the base layer 3 is a product in which the synthetic resin layer 3a has been welded to the surface of the reflecting layer 2 (a transparent resin layer 7 in this embodiment) by the use of a combination of pressure and heat. As shown in FIG. 4, before subjecting the base layer 3 to bonding, the synthetic resin layer 3a, the colored layer 3b, and the silicone layer 3c, which is parting agent, are disposed on a base film 8, and these layers 3a–3c are attached to the reflecting layer 2 by heat and pressure welding. The silicone layer 3c may also serve as a layer to protect the colored layer 3b. The silicone layer 3c may not necessarily be attached to the surface of the colored layer 3b, or may be made of a resin other than silicone resin which is capable of protecting the colored layer 3b. This base layer 3 is preferably thicker than a layer as formed by a conventional printing process such as silk screening. In this embodiment, the synthetic resin layer 3a and colored layer 3b as the principal layers, have a thickness of 2 $\mu$m and 4 $\mu$m respectively, but these value may be changed as desired. Additionally, with this embodiment, the use of titan foil may avoid any interference of the light storage layer 4 which will be described later, and as compared with a base layer as formed by printed white ink, can completely avert the influence of the color of the reflecting layer 2. This may provide additional advantages in improvement of the emissive power of the light storage layer 4.

The light storage layer 4 is formed on the base layer 3 by applying light storage ink, the latter through a process such as silk screen printing. The light storage ink is a mixture of light storage pigment and transparent curing resin at a mixing ratio of the light storage pigment to the curing resin being 40 to 60 in part by volume. This ratio may be properly changed depending on the type of the light storage ink. The light storage ink may be applied to one or more layers; two layers in this embodiment.

There are two different types of the light storage ink; one is of a one-pack type, and the other one is of a two-pack type, any one of which is usable. However, since two-pack light storage ink once mixed with a principal agent containing pigment and curative agent can not be preserved, residuary ink must be discarded, thus being likely to cause an increase in cost. Therefore, it is advantageous to use a one-part-liquid system. In particular, now that the production process of this invention employs the light storage layer 4 attached to said base layer 3, even a one-pack pigment can be used without problem.

There are two different production processes. One of the processes comprises steps of welding the base layer 3 to the reflecting layer 2 by means of heat and pressure, and printing the light storage layer 4 on the base layer 3. The other one comprises printing the light storage layer 4 on the base layer 3, and then, providing both layers 3, 4 on the reflecting layer 2 by welding the base layer 3 to the reflecting layer 2 by means of heat and pressure. Specifically, the former process includes a procedure of subjecting the base layer 3 cut into a desired form such as letters, figures, or patterns to thermocompression bonding, and the other procedure of subjecting the base layer 3 to thermocompression bonding using a thermocompression-bonding die in the form of a desired design such as letters, figures, or patterns, so that only the design portion may remain attached to the reflecting layer 2. The latter process includes a procedure of printing the light storage layer in a proper shape such as desired letters, figures, or patterns on a sheet-like base layer 3 with an indeterminate form, and cutting the printed layer 4 together with the base layer 3 along the design figure and subjecting the cut layers to thermocompression bonding (or omitting the cutting procedure, the base layer is subjected to thermocompression bonding using said die), and another procedures of printing the light storage layer 4 on almost entire base layer 3 having an indeterminate form, and cutting both layers 3, 4 along the desired contours of letters, figures, or patterns and subjecting them to thermocompression bonding (or omitting the cutting procedure, they are subjected to thermocompression bonding using said die). Any of the processes may be usable.

The coating layer 5 is intended to protect the reflecting layer 2 and light storage layer 4. It may be made of a transparent resin, such as a thermosetting urethane resin or epoxy resin, ultraviolet-curing resin, etc. In this embodiment, flexible epoxy resin is in use. With this embodiment, the coating layer 5 has the central part which has been raised to a level higher than that of the periphery thereof by the pot die forming. This specific flexible epoxy resin is useful because it has no effect on the light storage layer 4, and may impart non-slip characteristics and high-impact properties to the light storage and reflecting device 1.

Figure 6:
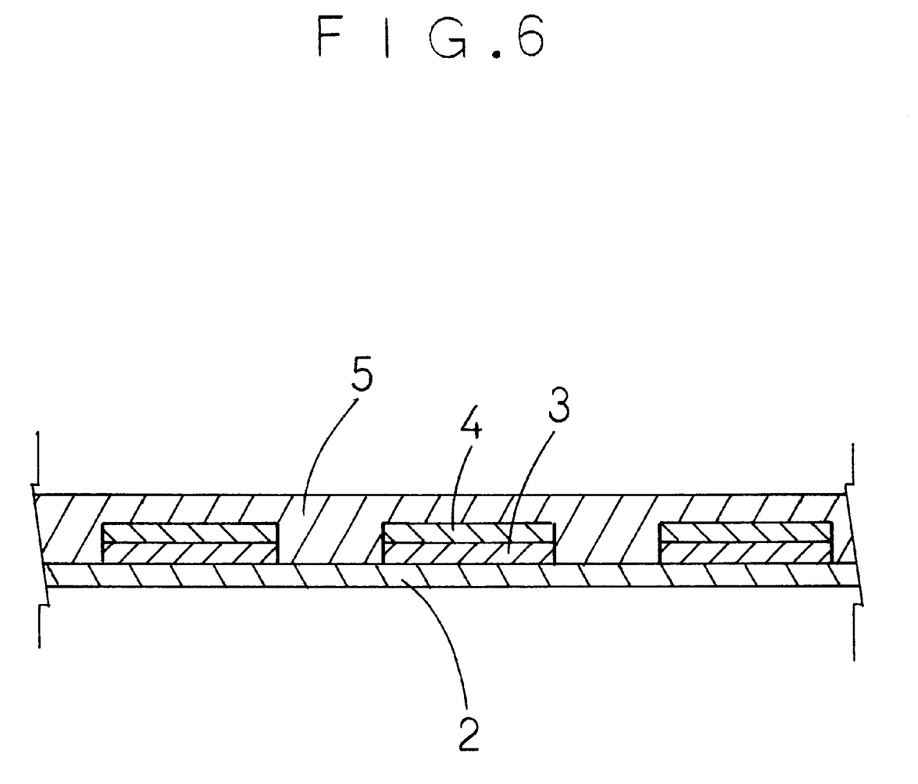
FIG. 6 is a cross sectional view depicting a light storage and reflecting device in accordance with a further embodiment of the present invention.

Furthermore, the lamination process or silicone process may be used to form the coating layer 5 flat. In that case, as shown in FIG. 6, the base layer 3 and light storage layer 4 are covered all together with the coating layer 5, and a resultant combination of the layers is cut properly into a final product.

The present invention may afford a marked increase in the degree of adhesion between the base layer 3 and light storage layer 4 in such a manner that the product may be used outdoors even if it has no coating layer 5. Therefore, the coating layer 5 may be provided as needed.

Said light storage and reflecting device 1 has an adhesive layer 9 formed on the rear of the reflecting layer 2 for enabling said device 1 to stick to an object by peeling a release paper off the rear. This adhesive layer 9 is generally used in seals or stickers. The adhesive layer 9 may be formed on the rear of the reflecting layer 2 in advance, and provided with a release paper (not shown) as needed. In this connection, the light storage and reflecting device 1 may be attached to a proper position, after the same manner of the seals or stickers. In the production process, the reflecting layer 2 that is formed with the base layer 3 and light storage layer 4 is punched into a desired figure, and then, the outer periphery of the coating layer 5 is allowed to reach the outer periphery of the resultant figure through the pot die forming. During this process, the workability is increased if the outer periphery of the coating layer 5 has temporarily been bonded to the release paper by the adhesive layer 9 at the rear of the reflecting layer 2 in advance.

Figure 5:
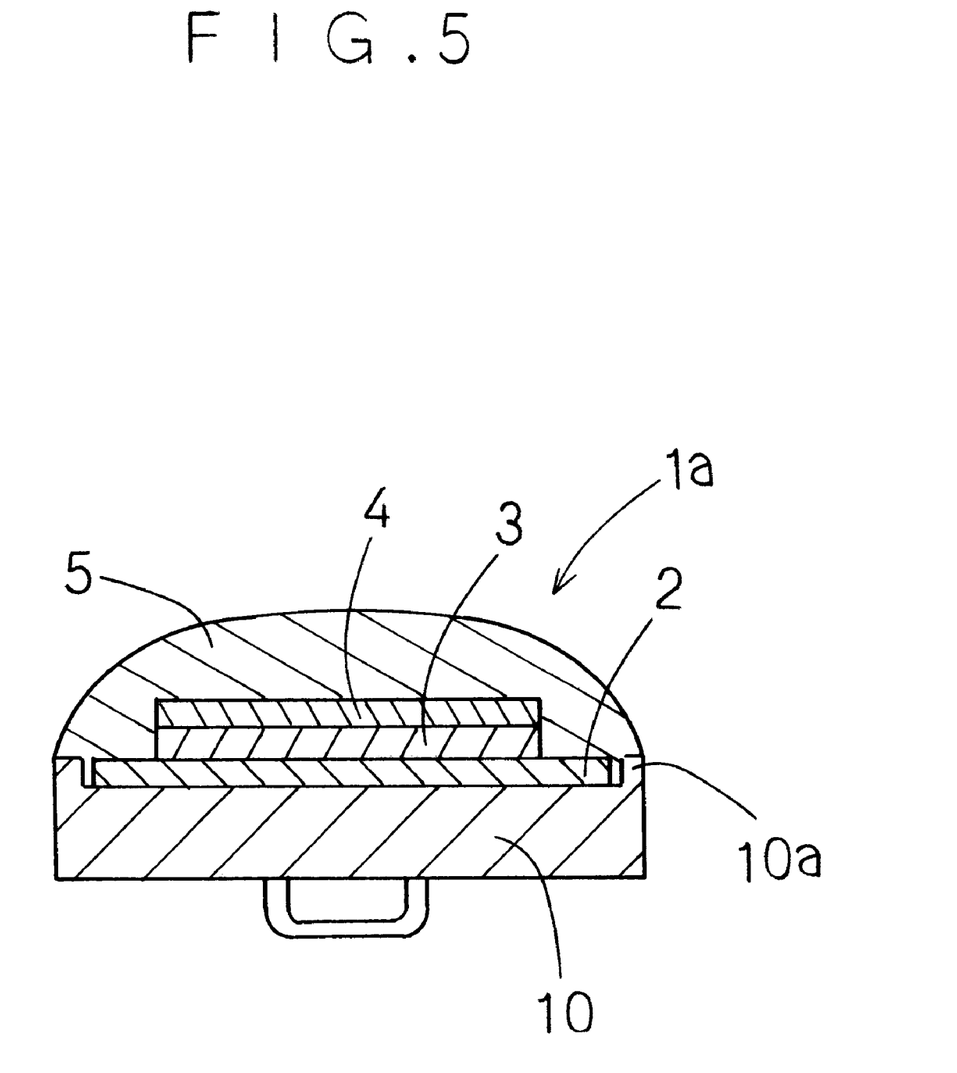
FIG. 5 is a cross sectional view depicting a light storage and reflecting device in accordance with another embodiment of the present invention.

Next, FIG. 5 shows a second embodiment, in which the portions that are same in the function as those in the first embodiment are marked with the same symbols, and no detailed description will be made.

With reference to a light storage and reflecting device 1a in accordance with the present embodiment, reflecting layer 2, base layer 3, and light storage layer 4 are much the same as the foregoing. As shown by FIG. 5, the light storage and reflecting device 1a is arranged such that these layers are formed on a base material 10 made of metal, resin, or ceramic, and all the layers including the base material 10 are covered with the coating layer 5. The base material 10 may be made in the form of various articles such as a button, badge, or golf marker. With this embodiment, on the front side of the base material 10 are there arranged the reflecting layer 2, the base layer 3, and the light storage layer 4 together with the coating layer 5 formed thereon. The coating layer 5 is formed to overhang the reflecting layer 2 having base layer 3 and light storage layer 4 formed thereon, so that part of the coating layer 5 may be cured in direct contact with the base material 10 to ensure that the coating layer 5 and the base material 10 will firmly join together and the base layer 3 and light storage layer 4 will be sealed in both members 5, 10, which may afford higher durability. In addition, the provision of a rising external wall 10a around the base material 10 advantageously renders the connection between the coating layer 5 and the base material 10 more firm. In this embodiment, the coating layer 5 is formed to extend to the outer periphery of the external wall 10a, but such an extension may be restricted to the inner periphery. Furthermore, the coating layer 5 may be made bigger than the external wall 10a in height, but it may be levelled with or lower than the external wall 10a. Of course, if no external wall 10a is provided, the coating layer 5 may be extended to the periphery of a base material 10 whose surface is flat.

Next, for better understanding of the present invention, the embodiment of the present invention will be described with reference to the comparative examples; the present invention should not be understood to be limited to these examples.

EXAMPLE 1

The light storage and reflecting device 1 as shown in FIG. 1 was produced by the following method.

A sheet formed into a square whose one side is 9 inches, and having adhesive layer 9 and a release backing paper (not shown) attached thereto, a product branded with the name "REFLEXITE AP-1000" (microprism reflective sheet) and manufactured by Reflexite Kabushiki Kaisha was used as reflecting layer 2. Circular cuts each having a diameter of 15 mm, which are to become flat when completed, are formed on the reflecting layer 2 in advance. Specifically, a sheet of reflecting layer 2 was provided with about 50 segments formed by said cuts.

Then, the base layer 3 was bonded by means of thermocompression on part of the segments in the reflecting layer 2. Thickness of each of layers constituting the base layer 3 is as follows: a synthetic resin layer 3a (polyvinyl acetate resin) is 2 µm, a colored layer 3b (titan foil) 4 µm, and a silicone layer 3c 0.05 µm. The base layer 3 was made nearly as large as the sheet, placed on the reflecting layer 2 with the synthetic layer 3a kept in contact with the latter, and pressed with a thermocompression-bonding die of a desired shape from the base film 8 and heated simultaneously, and then, the base film 8 was released.

The next step was the formation of a light storage layer 4 on the base layer 3. Referring to the light storage layer 4, use was made of a one-pack-liquid ink for light storage that is a mixture of a pigment branded with the name "GLL-300M" (of a low luminous intensity excited-type) made by Nemoto Tokusyu-Kagaku Kabushiki Kaisha, and transparent resin of vinyl chloride in a ratio of 40 to 60 (part by weight). The silk screen printing was employed as painting means. After the printing, the printed matter was subjected to air-drying for one hour, and then, the same printing was conducted again until a final light storage layer 4 had been made about 100 µm thick. The air-drying had been performed twice, the time totalling two hours.

Then, the reflecting layer 2 formed with the base layer 3 and light storage layer 4 was released from the release paper together with the segments formed by said cuts, and transferred to another release sheet, and then, a coating layer 5 made of transparent flexible epoxy resin was formed by the potting process so as to overlay said processed layers, and finally, heated at 80° C. for one hour until a complete light storage and reflecting device 1 of the first embodiment had been made.

EXAMPLE 2

The reflecting layer 2 formed with the base layer 3 and light storage layer 4 in accordance with the example 1 was attached to a base material 10 (base material used for making an iron golf marker with a plated surface) as shown in FIG. 5, then, UV resin is formed by the potting process so as to overlay said processed layers, and ultraviolet was applied to the resultant matter until a complete light storage and reflecting device 1a of Example 2 had been made.

COMPARATIVE EXAMPLE

Except that only the base layer 3 and light storage layer 4 had been formed by the following method, a light storage and reflecting device of a comparative example was produced by the same process as that in Example 1.

In this production process, the base layer 3 was formed out of two-pack epoxy ink (white color) by means of the silk screen printing. In the printing of the two-pack epoxy ink, ten hours was needed for the air-drying process. The painting was done at one time. The light storage layer 4 was formed on the completed base layer 3 by the silk screen printing. The ink of light storage layer 4 was a compound of light storage pigment that is the same as that of Example 1 and the two-pack epoxy ink. The painting was executed twice. In case of this two-liquid epoxy ink, ten hours was needed for the air-drying procedure. Because this process was made in twice, it took 20 hours to form the light storage layer only, and the time required for the air-drying procedure, including the time for the formation of said base layer 3, was 30 hours in total.

EVALUATION 50 samples were produced for Examples 1 and 2, and Comparative example respectively, and evaluated by means of visual inspection. Referring to Examples 1 and 2, it was found that 50 light storage and reflecting devices of each example had no crack, and looked good. For Comparative example, of all 50 sample pieces, 27 was found to include cracked light storage layers 4.

Referring to Examples 1 and 2, the products had been held outdoors for 30 days after the production, but no change was found in visual appearance.

APPLIED INSTANCES

Uses of separate kinds of light storage devices as explained above will be exemplified.

Figure 7A:
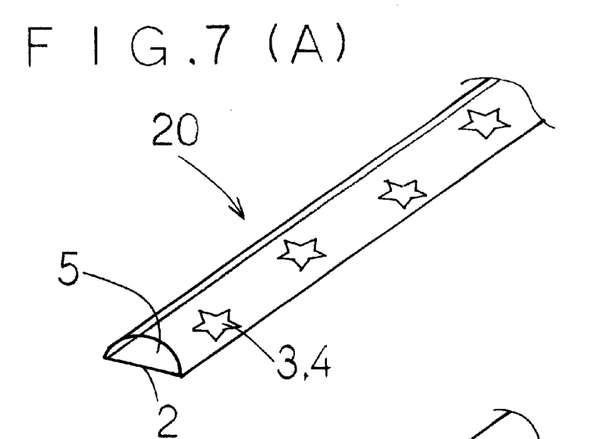
Figure 7B:
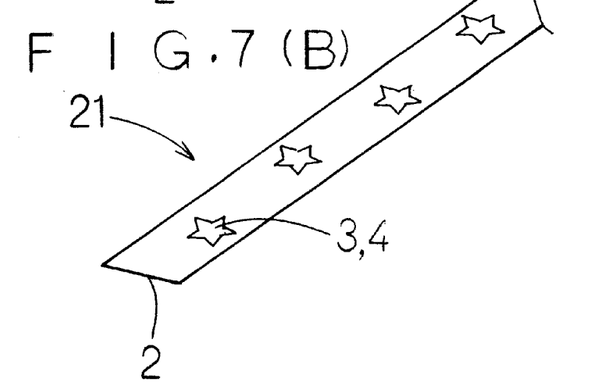
Figure 7C:
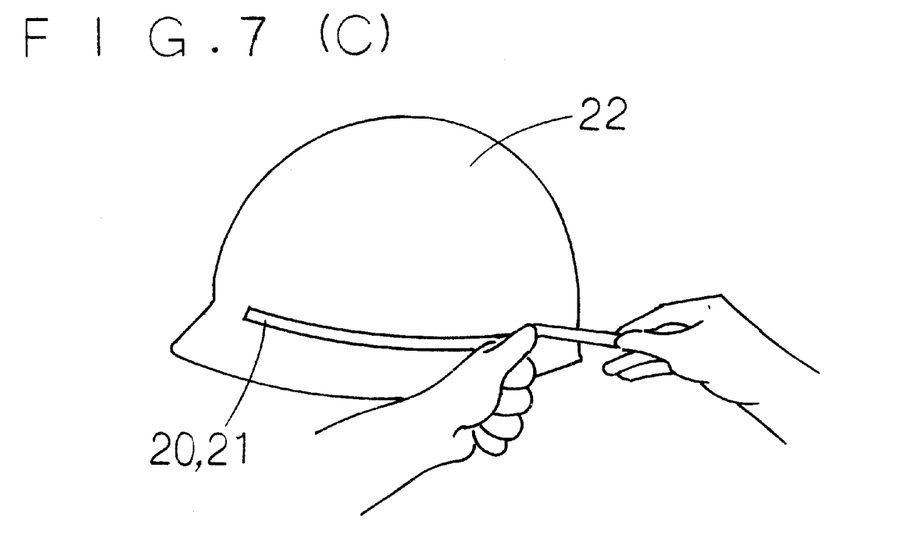

First, it is properly usable as a tape 20 as shown in FIG. 7(A). Additionally, it may be available for a tape 21 free from coating layer 5 as shown in FIG. 7(B). These tapes 20, 21 can be severed by scissors or cutter into a desired length, so that they may be stuck to a desired object 22, as shown in FIG. 7(C). Furthermore, it may also take the form of a sticker (not shown).

Figure 8:
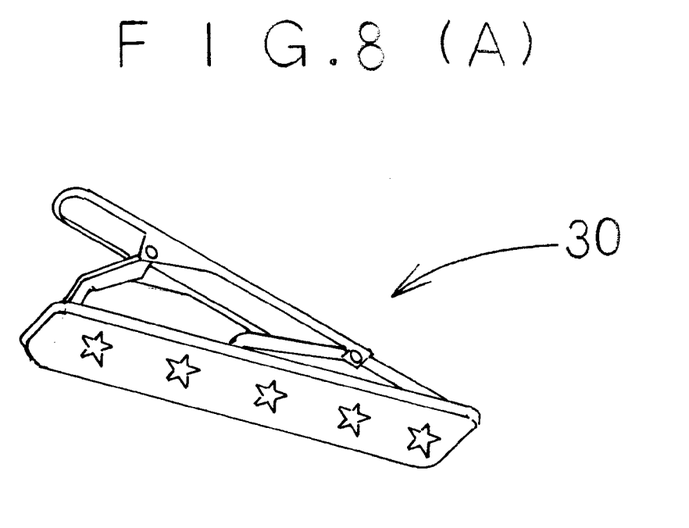

As shown by FIG. 8, it is applicable to a tie clasp 30. This item is produced by attaching said tape 21 on a pedestal 31 made of iron, and forming a coating layer 5 in a manner that it will be raised above the surface by the potting process. Resin such as an epoxy resin or UV resin (ultraviolet-curing resin) may be properly used to make this specific coating layer 5. In this case, the tape 21 is not attached direct to the pedestal 31 but to a thin plate made of iron, and the resultant combination is mounted on the pedestal 31.

Figure 9:
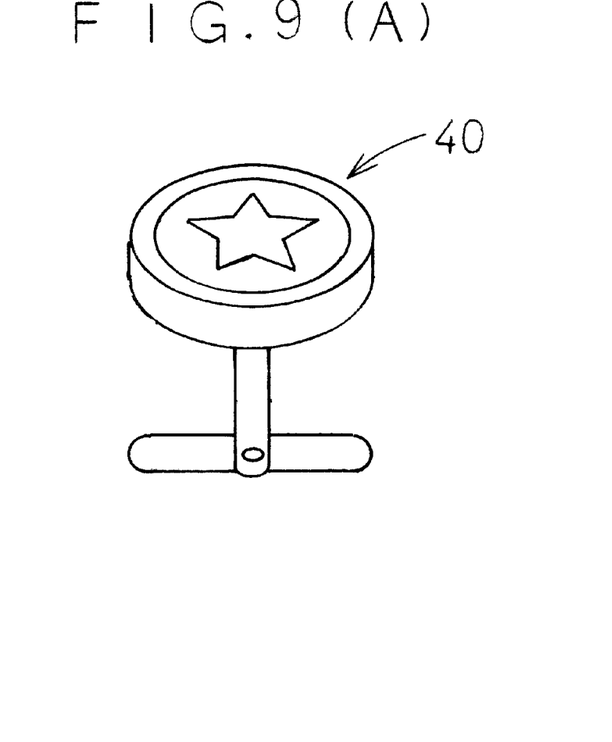

In addition, it may be used for a cuff link 40, as shown in FIG. 9. In this case, reflecting layer 2, base layer 3, light storage layer 4, and coating layer 5 are embedded in a cuff link pedestal 41.

Figure 10:
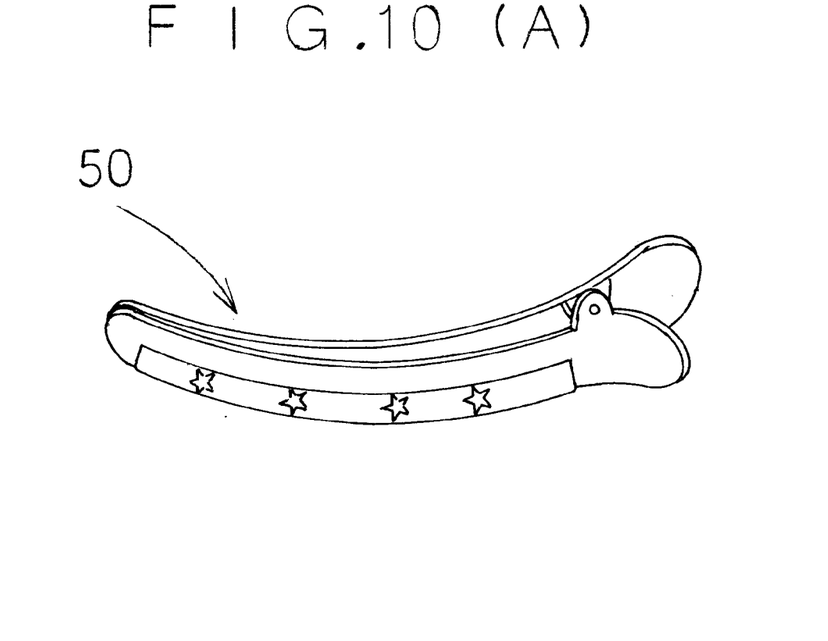

As shown in FIG. 10, it is applicable to a hair clip 50. In this case, said tape 20 is attached to a hair clip stock 51.

Figure 11A:
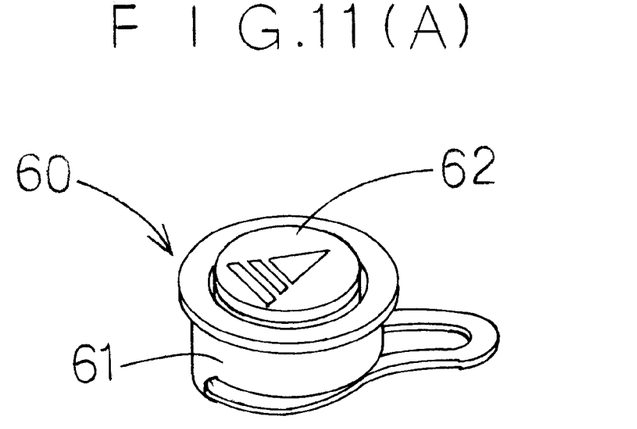
Figure 11B:
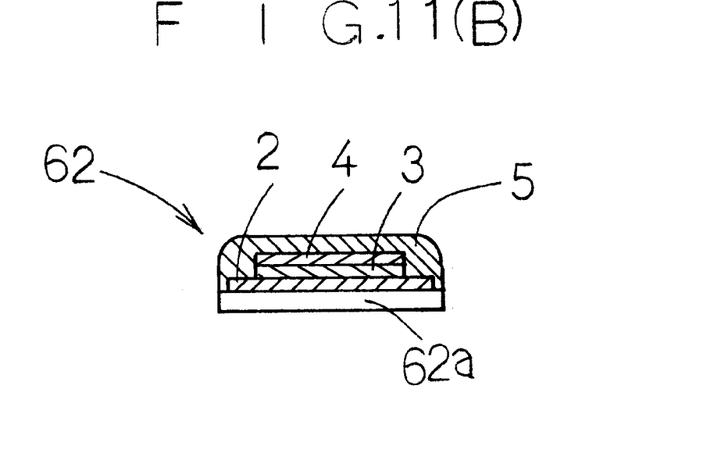

As shown in FIG. 11(A), it may be applied to a golf marker 60. This marker body 62 has a reflecting layer 2, a base layer 3, a light storage layer 4, and a coating layer 5 which has been formed on a magnetic plate 62a, as a plated iron plate by the similar process to the above-mentioned. The marker body 62 is removably mounted on a base stock 61 provided with a clip 63 that may grip a hat or clothing tightly. The removable mechanism is arranged such that a magnet (not shown) attached to said base stock 61 may attract the magnetic plate 62a of the marker body 62.

Figure 11C:
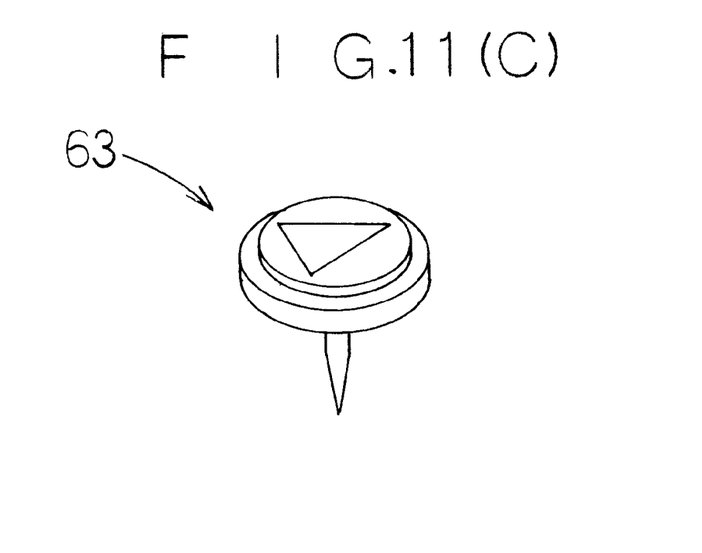

Another example of the golf marker may include a golf marker 64 as shown in FIG. 11(C), which is provided with a needle portion 65.

The light storage and reflecting device in accordance with the present invention is not restricted in its use to what have been exemplified above, but is usable to separate kinds of articles such as household utensils or sporting goods.

Referring to the light storage and reflecting device 1 in accordance with the embodiment of the first invention of the present application, so much time is not required for drying of the base layer 3, and the base layer does not crack thereby causing no inferior products, so as to ensure that the production procedure will be improved and the yield rate of products will be increased as well.

In the light storage and reflecting device 1 in accordance with the embodiment of the second invention of the present application, the arrangement of the base layer 3 that is composed of synthetic resin layer 3a and colored layer 3b may help the base layer 3 stick to part of the reflecting layer 2.

With the light storage and reflecting device 1 in accordance with the embodiment of the third invention of the present application, the adhesive layer 9 provided on the rear of the reflecting layer 2 makes it easy to attach the light storage and reflecting device 1 to a substance in such a manner that the latter may serve as a seal or sticker.

The light storage and reflecting device 1a in accordance with the embodiment of the fourth invention of the present invention may be applied to the goods in the form of not only a seal or sticker but also a badge or button.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A light storage and reflecting device having at least three layers, in which a base layer is formed on part of a reflecting layer, and a light storage layer is formed on said base layer, the improvement comprising; said base layer being constituted by a colored sheet bondable to said reflecting layer by heat and pressure, wherein the reflecting layer and light storage layer are covered with a coating layer, and said base layer includes a synthetic resin layer attachable to part of said reflecting layer, and the colored sheet formed on the synthetic resin layer.

2. The light storage and reflecting device as defined in claim 1, wherein said reflecting layer is provided with an adhesive layer on a rear surface thereof.

3. The light storage and reflecting device as defined in claim 1, wherein the coating layer covers all said layers including a base material.

4. A light storage and reflecting device comprising a reflecting layer, base layer, light storage layer, and coating layer is arranged such that a colored sheet of the base layer is bonded to the surface of the reflecting layer by a thermo-compression bonding process the improvement comprising:

the light storage layer being formed by ink containing light storage pigment on the colored sheet, and all layers being collectively covered with the coating layer.

* * * * *

UNITED STATES PATENT AND TRADEMARK OFFICE
CERTIFICATE OF CORRECTION

PATENT NO. : 6,569,522 B2  Page 1 of 1
DATED : May 27, 2003
INVENTOR(S) : Shoji Yamaguchi It is certified that error appears in the above-identified patent and that said Letters Patent is hereby corrected as shown below:

<u>Title page,</u>
Below Item [76] Inventor, insert the following:
-- [73]   Assignee:   Yamaguchi Kogeisha Co., Ltd., Osaka (JP) --

Signed and Sealed this

Seventeenth Day of February, 2004

JON W. DUDAS
*Acting Director of the United States Patent and Trademark Office*